July 31, 1951  A. H. FREDRICK ET AL  2,562,309
RADIO RECEIVER CONTROL APPARATUS
Filed Oct. 30, 1944  2 Sheets-Sheet 1
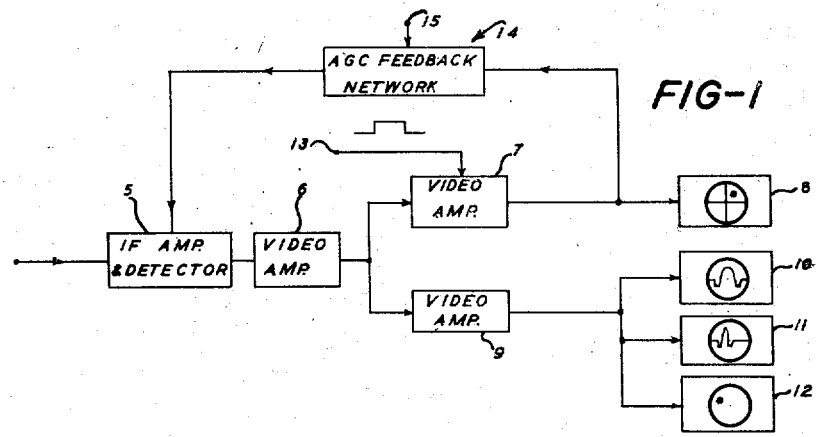
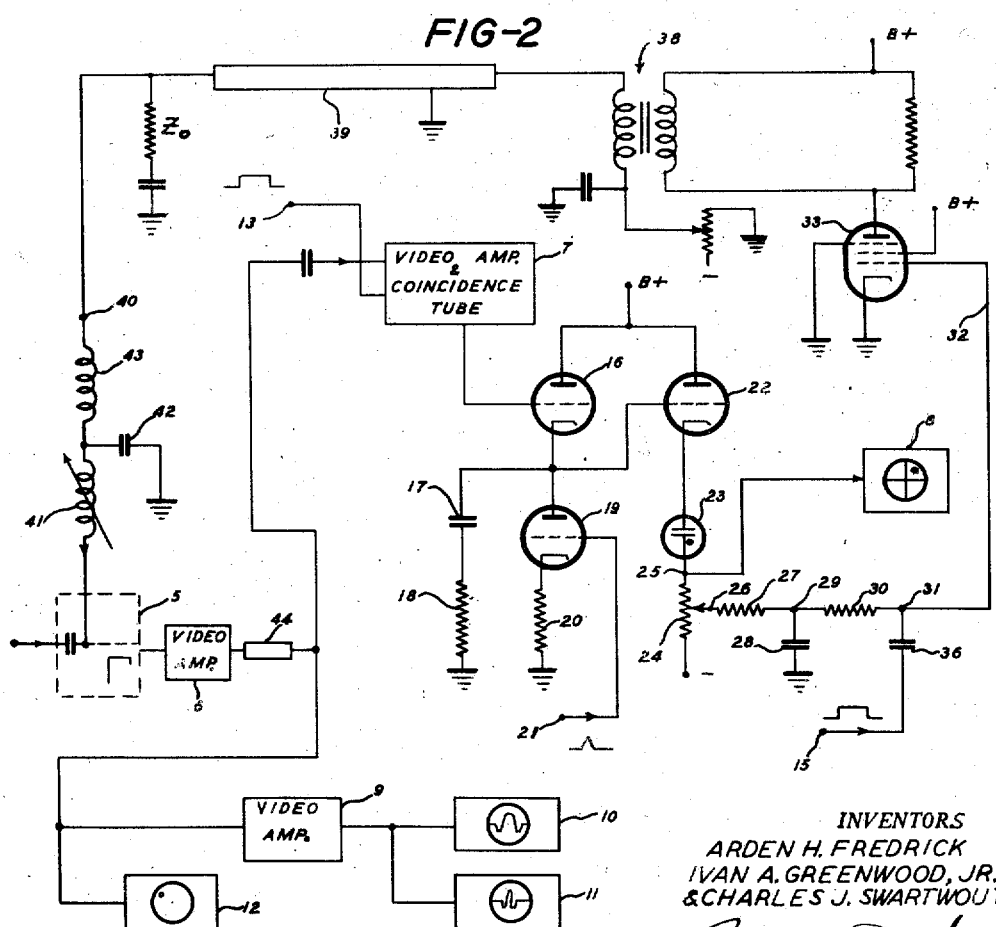
INVENTORS
ARDEN H. FREDRICK
IVAN A. GREENWOOD, JR.
& CHARLES J. SWARTWOUT
BY William D. Hall July 31, 1951     A. H. FREDRICK ET AL     2,562,309
RADIO RECEIVER CONTROL APPARATUS
Filed Oct. 30, 1944     2 Sheets-Sheet 2
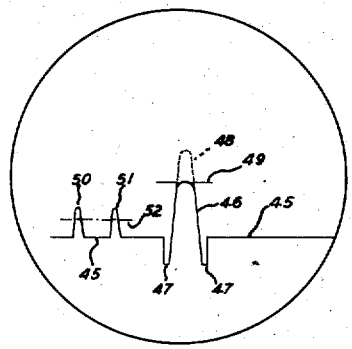
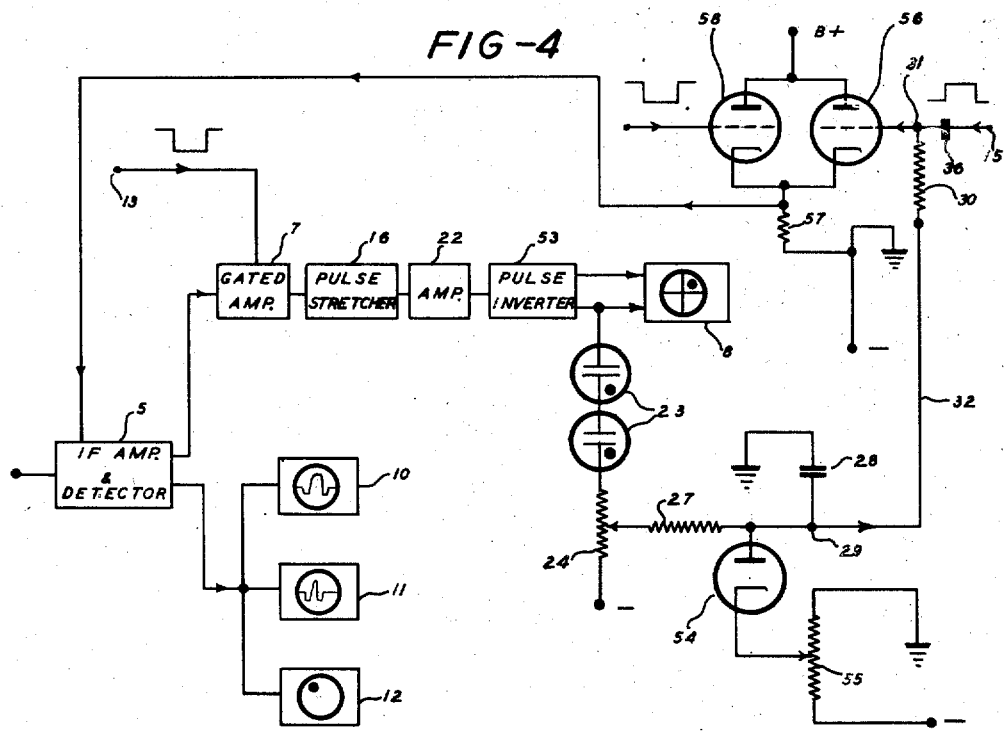
INVENTORS
ARDEN H. FREDRICK
IVAN A. GREENWOOD, JR.
& CHARLES J. SWARTWOUT
BY William D. Hall.

Patented July 31, 1951

2,562,309

UNITED STATES PATENT OFFICE 2,562,309

RADIO RECEIVER CONTROL APPARATUS

Arden H. Fredrick, Ivan A. Greenwood, Jr., and Charles J. Swartwout, Boston, Mass., assignors, by mesne assignments, to the United States of America as represented by the Secretary of War Application October 30, 1944, Serial No. 560,992

4 Claims. (Cl. 250—20)

This invention relates to automatic gain control and particularly to pulsed or gated automatic gain control.

Apparatus for the detection of aircraft may include an A-scope which gives a visual presentation of the echo or reflected signal as a function of range or distance, a PPI (plan position indicating) oscilloscope which locates the object with reference to polar coordinates of azimuth and range, an R-scope or a J-scope which affords an expanded presentation of that portion of the A-sweep of primary interest to the observer, and an automatic tracking means or a manual tracking means employing a precision indicator for representing the pointing error by means of a spot indication located, for example, against the coordinates of azimuth and elevation, such tracking means serving to insure accuracy in training the guns or other desired instrumentality upon the target under observation. The present invention is chiefly concerned with improvements in the automatic gain control of tracking and R-scan circuits or in like equipment, but it also indirectly enables more satisfactory functioning of the A-scope and PPI or like equipment.

In obtaining the desired precision of aiming by means of an automatic tracker or a precision indicator, advantage is taken of the fact that when the target is displaced from the mean axis of the conically scanning searching beam, its echo signals will be modulated. The amount of modulation of the echo signal is a measure of the magnitude of the pointing error. The operation of the equipment would be impaired if any of this modulation were lost by reason of saturation effects in the video amplification circuits. Therefore, it is desirable that an automatic gain control be applied whenever a strong reflected signal is received.

It is customary to apply what is known as a range gate in order to render the tracking means responsive only to echo signals coming from a particular range. The range gate is a timed control pulse for effecting operation of the equipment only during intervals when the selected signals are due to arrive. The R-scope (or J-scope, if one is employed) indicates whether or not the range gate is properly placed in coincidence with the target signal. The R-sweep is also of utility in monitoring the precision indicator so as to readily detect false indications thereon. For instance, if there are two targets close together in range and azimuth, use of the precision indicator may result in pointing to an illusory target between these two objects. On the R-scope, however, there would appear a double-humped image which would immediately inform the operator that the precision indication might be erroneous and should not be relied upon without further investigation. This, of course, assumes that no saturation effects are present in the R-scope circuits, and hence it is essential that the automatic gain control be applied to these circuits as well, to insure against distortion of the echo image under a strong signal.

The present invention contemplates applying the automatic gain control only during the time interval when echo signals from a selected range are being received. In this way the apparatus is able to function in the usual manner, without gain control, to receive signals from other locations which may require a relatively high degree of amplification. For example, an incoming bomber might afford a target whose reflected signals are strong enough to require gain control, while the escorting fighter aircraft would give weaker signals which should not be subjected to such control.

In view of the foregoing, it is a primary object of this invention to enable the undistorted reception and presentation of modulated signals from the main target while making it possible to view weaker signals from other targets.

Apparatus which has been developed heretofore along these lines has had the disadvantage of requiring two I. F. channels and moreover it has not been possible to regulate the automatic gain control in such a manner as to bracket only the target signal concerned.

Therefore, it is another object of this invention to attain simplification by the use of only a single I. F. channel, and a further object is to accurately restrict the effect of the pulsed automatic gain control to the time interval during which the strong target signal is being presented.

Other and further novel features and advantages will be apparent from the following description of the invention and the scope of the appended claims.

In the drawings:

Fig. 1 is a block diagram of a system which is used to accomplish the purpose of the present invention;

Fig. 2 is a schematic circuit diagram of a preferred form of the invention;

Fig. 3 is a view showing a typical signal representation appearing on an A-scope or an R-scope in the present system; and Fig. 4 is a schematic circuit diagram showing an alternative embodiment of the invention.

For purposes of describing the present invention, it will be assumed that a conventional antenna system such as a conical scanning means is employed to radiate and receive the signal pulses. Referring to Fig. 1, which diagrammatically illustrates the system, the incoming echo signal passes through an I. F. amplifier and detector section 5, thence through a video amplification stage 6 and is then fed to two parallel video amplification branches, one of which designated 7, leads to a precision indicator 8 and the other of which, designated 9, supplies the R-scope 10, A-scope 11 and PPI 12. It should be noted that while a precision indicator is embodied in the illustrated forms of the invention, the improvements disclosed herein are equally applicable to automatic tracking apparatus. Likewise, a J-scope may be used in place of an R-scope if desired. The parallel video branches may alternately occur after the detector stage instead of after the first video stage, or after a later video stage.

Conventional range gating means indicated at 13 controls the video amplifier 7 so that the precision indicator 8 is sensitized only during the time interval when echo signals from a selected range are being received. An automatic gain control feedback network, generally designated 14, is controlled jointly by the gated video amplifier 7 and a pedestal pulsing means 15 for reducing the gain of the I. F. section 5 during the time interval when a strong signal is being received from the selected range. In the present arrangement, this gain control affects all the amplification circuits associated with the various indicators 8, 10, 11 and 12 thereby to prevent saturation by the echo signal which is under observation.

Throughout the specification and claims the terms "gate" and "pedestal" should be understood to mean "gate pulse" and "pedestal pulse," respectively, in accordance with the terminology of the art.

The pertinent details of the preferred embodiment of the invention are shown in Fig. 2. The range gate supplied by the source 13 is in the form of a substantially rectangular positive pulse which is applied to the first grid of the video amplifier and coincidence tube included in the video amplifier 7. The incoming video signal is applied to the third grid of this tube. Range gating devices as 13 are well known in the art and hence a detailed disclosure is not presented herein.

Inasmuch as the time interval during which the selected signal is being received is very brief and would not be sufficient to enable a readily discernible visual indcation to appear on the precision indicator 8, means are provided for stretching the rectangular signal pulse so that the fluorescent screen on the cathode ray tube may be activated to produce a luminous spot indication which by its position with reference to a central point indicates the amount of pointing error. Such pulse stretching means in the present instance comprises a triode 16, condenser 17, and resistor 18, the latter two elements being connected in series to provide a path from the cathode of tube 16 to ground. The gated video pulse from the amplifier 7 is applied to the grid of tube 16 rendering the tube conductive for the duration of the pulse. The condenser 17 charges up during the brief interval when tube 16 is conducting and remains in this charged condition until a discharge path is provided, except for such slight leakage as may occur. Such a discharge path is afforded through a tube 19 and resistor 20. Tube 19 is rendered periodically conductive by a discharge pulse or gate applied to the grid of this tube from a source 31. The means for producing the discharge gate is conventional and may be conveniently controlled by the range gating means 13 so as to operate in timed relation therewith. It is possible by this means to follow signals which vary rapidly from pulse to pulse. The result of this pulse stretching operation is to produce a signal pulse of comparatively long duration which is applied to the grid of an amplifier tube 22. The average potential applied to the grid of tube 22 over each repetition interval is only slightly less than the peak value of the pulse appearing on the cathode of tube 16 during that interval.

The amplifier circuit, including tube 22, is arranged as a cathode follower in which the cathode is connected to a potentiometer resistance 24 through the medium of a gaseous tube such as a neon tube 23, the resistance 24 being in turn connected to a source of voltage negative with respect to ground potential. The neon tube 23 affords a voltage drop of substantially constant value thereby reducing the potential across the load resistance 24 without attenuating the incremental voltage changes. The signal voltage applied to the precision indicator 8 is taken from the cathode circuit of the tube 22 at a point 25 intermediate the neon tube 23 and the resistor 24. From point 26 on the adjustable arm of the potentiometer 24, a portion of the signal voltage is passed through an L-filter section consisting of the series resistance 27 and a shunt condenser 28 in order that the output voltage at point 29 will contain only components below the conical scan frequency. The terminal 29 is connected by a grid leak resistor 30 to a terminal 31 from which a wire 32 leads to the control grid of a pentode 33 which controls the AGC feedback. The potentiometer 24 is adjusted so that the nonpulsed level of the voltage at point 26 is below the cut-off grid voltage for the tube 33.

An AGC pedestal consisting of a rectangular, positive pulse from a source 15 is applied through a blocking condenser 36 to the point 31. The source 15 may be part of, or controlled by, the range gate source 13 so as to function in timed relation therewith. Compared to frequencies in the AGC pedestal, the output voltage at the filter terminal 29 is practically D.-C., its value being determined by the amplitude of the video signals. During the time when the pedestal is applied to the point 31, a voltage is developed across the grid leak resistance 30 which raises the potential at point 31 above that of point 29, causing a pulse to be applied to the control grid of tube 33 which is proportional to the sum of the pedestal voltage and the potential at point 29. This combined pulse is sufficient to cause conduction in the tube 33. It will be noted that this tube is rendered conductive only during the interval in which the pedestal is applied and then only if a video signal is received within the interval of the range gate.

When the tube is rendered conductive in the manner just described, pulses of a magnitude depending upon the value of the bias at point 31 are delivered by this tube to its plate circuit and are transmitted through a pulse transformer 38 and coaxial transmission line 39 to the grids of the early I. F. stages. These pulses are negative in character due to the reversal in phase effected by the output circuit of the pentode 33. The transformer 38 matches the low impedance of the line 39 to the high impedance of the pentode driver 33. Negative grid bias for the I. F. stages is supplied through the secondary of pulse transformer 38 to the transmission line 39. From the terminal of the transmission line 39 (point 40, Fig. 2) an inductance-capacity network leads to the grids to which the incoming I. F. signal is applied in the amplifier 5. The tuning inductance 41 presents a high impedance to the intermediate frequency, and the shunt condenser 42 provides a low impedance to ground at this frequency. The inductance 43 acts as series compensation for the AGC pulse, its value being so chosen with relation to the driving impedance and the capacity of the condenser 42 that the pulse going to the grids will be as nearly rectangular as possible. A coaxial transmission line 44 may be used if desired to connect the video amplifier 6 to the parallel video branches 7 and 9.

To summarize the operation of the system shown in Fig. 2, receipt of a strong I. F. signal causes a resultant rise of potential at point 29 to a comparatively high level. Application of the pedestal by source 15 under these conditions produces an AGC pulse which reduces the gain of the I. F. section 5. This affects all the indicators during the interval in which the pedestal is applied, thereby bracketing only the selected target signal. In Fig. 3 a typical R-scope or A-scope presentation is shown. The normal forward sweep or trace of the oscilloscope is along the horizontal line 45. The selected target signal appears at 46. The ditches 47 indicate that the desired target is within the range gate. Such an expedient is well known in the art and is accomplished by applying a voltage to the vertical plates of the cathode ray tube concurrently with the application of the range gate to effect the downward deflection as illustrated in Fig. 3. Without gain control the signal pulse 46 would be of a height as indicated by the broken line 48. The AGC pulse which is generated by the present system reduces the magnitude of the amplified echo signal to a level such as is indicated by the horizontal line 49 in Fig. 3. This insures against saturation of the amplifier circuits when a strong signal is being received and thereby preserves the modulation effects which are particularly desirable in the case of the precision indicator 8 and the R-scope 10. As a precaution, in actual practice, the AGC pulse is made slightly wider than the range gate and is centered about it.

As mentioned hereinabove, it is desired that weaker echo signals outside of the range gate, such as are indicated at 50 and 51, Fig. 3, will be received without gain control. Such operation is insured by virtue of the fact that an AGC pulse can only be transmitted during the interval in which the AGC pedestal is applied. Hence the echo signals represented at 50 and 51, Fig. 3, are given full amplification instead of being limited to a level such as indicated by the line 52, as would be the case if the automatic gain control were functioning.

It has been noted that the concurrence of the AGC pedestal and a strong signal from the selected range produces the pulsed AGC which prevents distortion of the target signal due to saturation effects. Since there is a delay in transmission of the AGC pulse to the receiver and also a delay in going through the receiver and back to the video amplifier and AGC control circuit, the AGC pedestal is timed to precede the range gate by an amount equal to this delay. This may be taken care of in the range unit where the gates are formed.

Under certain conditions it may be advantageous to apply either a positive or negative gain control to the I. F. stages depending upon the amplitude of the video signal. A circuit for performing this function is illustrated in Fig. 4.

In this modification of the invention, a range gate is applied to the video amplifier 7 in the precision indicator branch as in the previous case. A pulse stretcher and associated discharge circuit are included in this branch, and the stretched pulse is amplified and delivered to a pulse inverter 53 associated with the precision indicator 8, Fig. 4. This inverter functions to produce simultaneous pulses of equal and opposite polarity in a well known manner. Negative pulses from the inverter 53 pass through neon tubes 23 having constant voltage drops and thence through the resistance of a potentiometer 24 to the terminal of a voltage source which is negative with respect to ground potential. An R.-C. filter comprising resistance 27 and shunt condenser 28 filters the higher frequencies from the output voltage taken off the potentiometer 24. The output terminal 29 of this filter is connected by the wire 32 and grid leak resistor 30 to the point 31 at the grid of a triode 56, which is included in the AGC feedback network. A diode 54, the cathode potential of which is regulated by a potentiometer 55, limits the potential at point 29 in the positive direction so that the grids of the I. F. section are not driven above zero bias.

A positive pedestal is applied to the grid circuit of the tube 56 in such a manner as to build up a pulse voltage across the grid leak resistor 30 which is added algebraically to the negative potential at the output terminal 29. This pedestal is delivered in time relation with the range gate so as to bracket the target signal under observation.

Tube 56 in its normal state is non-conducting, and a tube 58 connected in parallel with this tube is normally conducting. The voltage across the common load resistor 57 in the cathode circuit of these tubes is therefore normally determined by the voltage on the grid of tube 58. Simultaneously with the application of the pedestal to the grid of tube 56, a range gate sufficiently negative to cut tube 58 completely off is applied to the grid of tube 58. This transfers control of the voltage across resistor 57 from tube 58 to tube 56. If the combined pulse voltage at the grid of tube 56 is greater than the normal voltage on the grid of tube 58, then the voltage across resistor 57 will increase during the pulse. Likewise, if the pulse voltage is less than the normal voltage on the grid of tube 58, the voltage across the load 57 will be lower than its normal value for the duration of the pulse. It is the voltage which is developed across the load 57 that determines the gain of the I. F. stages.

From the foregoing disclosure, it is apparent that this invention affords a simple and economical means for effecting a pulsed or gated automatic gain control in which the control pulse brackets only the selected target signal. Loss or impairment of the desired signal due to saturation in the amplifier circuits is prevented by virtue of this control, and yet the weaker signals are not suppressed.

While we have illustrated and described selected embodiments of our invention, it will be understood that these are capable of variation and modification without departing from the spirit of the invention. For example, the pulse-stretching means disclosed herein could be replaced by sufficient amplifier stages having time delay factors for accomplishing the same purpose. Furthermore, it is not essential that the AGC pulse be formed by means of a pedestal, inasmuch as the same effect can be produced by gating. Other changes will be obvious to those skilled in the art. Therefore, we do not desire to limit the scope of the invention to the precise details set forth herein but wish to avail ourselves of all improvements and combinations within the purview of the following claims.

We claim:

1. In an automatic gain control for a pulse receiver having range gating means to select a signal from a particular target, the combination of pulse stretching means controlled by said range gating means for amplifying and extending the duration of the selected signal pulse, means for generating a pedestal in timed relation with the formation of the range gate, and means controlled jointly by said pulse stretching means and said pedestal generating means for limiting the gain of the receiver.

2. In a pulse receiver provided with a precision indicator and range gating means for selecting the range from which signals are to be admitted to said precision indicator, an automatic gain control comprising means under control of said range gating means for amplifying and stretching the gated signal pulses, means for producing a substantially D.-C. voltage the magnitude of which depends upon the amplitude of the stretched pulses, pedestal means for producing voltage pulses of a redetermined value in timed relation with the gating of the signal pulses, a tube having a control grid, means for combining the D.-C. voltage and the pedestal voltage and applying the resultant potential to the control grid of said tube, and means controlled by said tube for feeding back a gain-controlling pulse to the receiver when the selected signal pulses exceed a predetermined amplitude, said pedestal means being so timed in relation to said range gating means that the gain control is effective upon only the gated signals.

3. In a pulse receiver provided with a precision indicator and range gating means for selecting the range from which signals are to be admitted to said precision indicator, an automatic gain control comprising means under control of said range gating means for amplifying and stretching the gated signal pulses, means for producing a substantially D.-C. potential the value of which varies negatively in proportion to the amplitude of the stretched pulses, pedestal means for producing voltage pulses of a predetermined positive value in timed relation with the gating of the signal pulses, a first tube having a control grid, means for algebraically combining said D.-C. potential and said pedestal pulses and applying the resultant voltage pulses to the control grid of said first tube, a second tube connected in parallel with said first tube, means affording a common output circuit for said tubes, gating means for rendering said second tube non-conductive during the periods when the pedestal is being applied and normally conductive when the pedestal is not being applied, and feedback means under control of said output circuit for applying to the receiver a control voltage the value of which is determined by the magnitude of the current in said output circuit.

4. In an echo detection receiver, range gating means operated periodically for selecting echo pulses, means controlled by said range gating means for producing amplified signals of greater time duration than the gated echo pulses, a second gating means operated in a predetermined timed relation with said range gating means, and variable means controlled jointly by said amplifying means and said second gating means for limiting the gain of said receiver whereby gated echo pulses are given different amplification in the receiver than are ungated echo pulses.

ARDEN H. FREDRICK.
IVAN A. GREENWOOD, JR.
CHARLES J. SWARTWOUT.

REFERENCES CITED

The following references are of record in the file of this patent:

UNITED STATES PATENTS

| Number | Name | Date |
| --- | --- | --- |
| 2,157,677 | Runge | May 9, 1939 |
| 2,276,708 | Wyckoff | Mar. 17, 1942 |
| 2,288,434 | Bradley | June 30, 1942 |
| 2,321,341 | Weatherby et al. | June 8, 1943 |
| 2,335,540 | Roberts | Nov. 30, 1943 |
| 2,406,019 | Labin | Aug. 20, 1946 |
| 2,408,742 | Eaton | Oct. 8, 1946 |
| 2,408,821 | Stearns | Oct. 8, 1946 |